(12) United States Patent
Tsuzuki et al.

(10) Patent No.: US 11,049,634 B2
(45) Date of Patent: Jun. 29, 2021

(54) ELECTROMAGNETIC ACTUATOR AND CONNECTION/DISCONNECTION APPARATUS

(71) Applicant: JTEKT CORPORATION, Osaka (JP)

(72) Inventors: Yuji Tsuzuki, Chiryu (JP); Hiroshi Takuno, Nukata-gun (JP)

(73) Assignee: JTEKT CORPORATION, Osaka (JP)

( * ) Notice: Subject to any disclaimer, the term of this patent is extended or adjusted under 35 U.S.C. 154(b) by 250 days.

(21) Appl. No.: 16/188,618

(22) Filed: Nov. 13, 2018

(65) Prior Publication Data

US 2019/0148045 A1  May 16, 2019

(30) Foreign Application Priority Data

Nov. 16, 2017 (JP) .............................. JP2017-221192

(51) Int. Cl.
| | |
|---|---|
| *H01F 1/00* | (2006.01) |
| *H01F 7/08* | (2006.01) |
| *H01F 27/28* | (2006.01) |
| *H01F 7/14* | (2006.01) |
| *F16D 27/00* | (2006.01) |

(52) U.S. Cl.
CPC ............ *H01F 7/081* (2013.01); *F16D 27/00* (2013.01); *H01F 7/14* (2013.01); *H01F 27/28* (2013.01); *H01F 2007/085* (2013.01); *H01F 2007/086* (2013.01)

(58) Field of Classification Search
CPC . H01F 7/081; H01F 7/14; H01F 27/28; H01F 2007/085; H01F 2007/086; F16D 27/00

USPC .......................................................... 335/209
See application file for complete search history.

(56) References Cited

U.S. PATENT DOCUMENTS

| | | | | |
|---|---|---|---|---|
| 2013/0178322 | A1* | 7/2013 | Takuno | ..................... F16H 1/32 475/178 |
| 2013/0257202 | A1* | 10/2013 | Takuno | .................. H02K 7/116 310/83 |

(Continued)

FOREIGN PATENT DOCUMENTS

| | | |
|---|---|---|
| JP | 57-204331 A | 12/1982 |
| JP | 2011-14101 A | 7/2011 |

(Continued)

*Primary Examiner* — Shawki S Ismail
*Assistant Examiner* — Lisa N Homza
(74) *Attorney, Agent, or Firm* — Oblon, McClelland, Maier & Neustadt, L.L.P.

(57) ABSTRACT

An electromagnetic actuator includes an electromagnetic coil, a yoke serving as a magnetic path of a magnetic flux of the electromagnetic coil, an armature configured to move in an axial direction while being attracted by the yoke by energization of the electromagnetic coil, and a housing that houses the armature. The armature and the housing are coupled to each other by an engagement structure in which protrusions provided on one of the members engage with engagement grooves formed in the other one of the members. At least a part of the engagement groove is inclined with respect to the axial direction. When the armature moves while being attracted by the yoke, the protrusions of the armature slide along the engagement grooves of the housing, and the armature turns relative to the housing along the inclination of the engagement grooves.

4 Claims, 7 Drawing Sheets

(56) References Cited

U.S. PATENT DOCUMENTS

| | | | | |
|---|---|---|---|---|
| 2014/0018202 A1* | 1/2014 | Nomura | ............... | F16H 1/32 |
| | | | | 475/149 |
| 2014/0128192 A1* | 5/2014 | Korenaga | ............ | B60K 17/046 |
| | | | | 475/5 |
| 2015/0068862 A1* | 3/2015 | Fujii | ............... | F16D 11/14 |
| | | | | 192/84.9 |
| 2015/0345566 A1* | 12/2015 | Hosokawa | ............ | F16D 27/09 |
| | | | | 192/66.1 |
| 2016/0169403 A1* | 6/2016 | Filippi | ............ | F16K 31/0675 |
| | | | | 239/585.1 |
| 2017/0074418 A1* | 3/2017 | Liang | ............... | H01F 27/325 |
| 2017/0175873 A1* | 6/2017 | Takuno | ............ | F16H 57/0428 |
| 2017/0184157 A1* | 6/2017 | Fujii | ............... | B60K 17/02 |
| 2017/0297429 A1* | 10/2017 | Ito | ............... | B60K 17/16 |
| 2018/0156348 A1* | 6/2018 | Hofmann | ............ | F16K 31/06 |
| 2019/0148045 A1* | 5/2019 | Tsuzuki | ............ | F16D 27/09 |
| | | | | 335/209 |

FOREIGN PATENT DOCUMENTS

| | | |
|---|---|---|
| JP | 2016-017596 A | 2/2016 |
| JP | 2017-133581 | 8/2017 |

\* cited by examiner

ELECTROMAGNETIC ACTUATOR AND CONNECTION/DISCONNECTION APPARATUS

INCORPORATION BY REFERENCE

The disclosure of Japanese Patent Application No. 2017-221192 filed on Nov. 16, 2017 including the specification, drawings and abstract, is incorporated herein by reference in its entirety.

BACKGROUND OF THE INVENTION

1. Field of the Invention

The present invention relates to an electromagnetic actuator including a movement member configured to move by energization of an electromagnetic coil, and also relates to a connection/disconnection apparatus including the electromagnetic actuator.

2. Description of the Related Art

Hitherto, an electromagnetic actuator including a movement member configured to move by energization of an electromagnetic coil and a connection/disconnection apparatus including the electromagnetic actuator are used in, for example, a drive system of a vehicle (see, for example, Japanese Patent Application Publication No. 2017-133581 (JP 2017-133581 A)).

The connection/disconnection apparatus described in JP 2017-133581 A is provided in a power transmission apparatus including an outer case and an inner case that are arranged coaxially so as to be rotatable relative to each other. The connection/disconnection apparatus connects or disconnects power transmission between the outer case and the inner case. The connection/disconnection apparatus includes a connection/disconnection member, an electromagnetic coil, a core, a movable member, an urging member, a coupling member, and a return spring. The connection/disconnection member is inserted through a hole extending in an axial direction through a wall portion of the outer case. The electromagnetic coil is arranged outside the outer case. The core holds the electromagnetic coil. The movable member moves in the axial direction by energization of the electromagnetic coil. The urging member urges the movable member in a direction opposite to the movement direction when the electromagnetic coil is energized. The coupling member is fixed to the connection/disconnection member, and receives a pressing force from the movable member. The return spring is arranged between the coupling member and the outer case, and urges the coupling member toward the core.

The movable member is arranged on an inner side of the electromagnetic coil. When the movable member moves in the axial direction by an urging force of the urging member, the movable member abuts against the core, and a further movement of the movable member is restricted. One end of the connection/disconnection member is arranged in the hole of the wall portion of the outer case, and a connection/disconnection portion is formed at the other end. When the electromagnetic coil is not energized, the connection/disconnection member receives the urging force of the urging member via the movable member and the coupling member, and the connection/disconnection portion meshes with the inner case. Thus, the outer case and the inner case are coupled by the connection/disconnection member so as not to be rotatable relative to each other. When the electromagnetic coil is energized, the movable member moves away from the connection/disconnection member by a magnetic force, and the connection/disconnection member is unmeshed from the inner case by a force of the return spring. Thus, the outer case and the inner case are decoupled from each other.

In the connection/disconnection apparatus described in JP 2017-133581 A, when the energization of the electromagnetic coil is stopped, the movable member strikes against the core to generate striking noise. A driver or a passenger of the vehicle may perceive the striking noise as abnormal noise, causing discomfort thereto.

SUMMARY OF THE INVENTION

It is one object of the present invention to provide an electromagnetic actuator in which generation of abnormal noise can be suppressed, and also provide a connection/disconnection apparatus including the electromagnetic actuator.

An electromagnetic actuator according to one aspect of the present invention includes:

an electromagnetic coil;

a yoke serving as a magnetic path of a magnetic flux of the electromagnetic coil;

a movement member configured to move in an axial direction while being attracted by the yoke by energization of the electromagnetic coil; and a housing member that houses the movement member.

The movement member and the housing member are coupled to each other by an engagement structure in which a protrusion provided on one of the movement member and the housing member engages with an engagement groove formed in the other one of the movement member and the housing member. At least a part of the engagement groove is inclined with respect to the axial direction. When the movement member moves while being attracted by the yoke, the protrusion slides along the engagement groove, and the movement member turns relative to the housing member along inclination of the engagement groove.

A connection/disconnection apparatus according to another aspect of the present invention is configured to switch between a coupled state in which a first member and a second member are coupled so as not to be rotatable relative to each other and a released state in which the first member and the second member are rotatable relative to each other. The connection/disconnection apparatus includes:

the electromagnetic actuator of the aspect described above;

a meshing member that is coupled to the second member so as to be axially movable but not to be rotatable relative to the second member and is configured to move in the axial direction together with the movement member; and an urging member configured to urge the meshing member and the movement member in a direction opposite to a movement direction when the electromagnetic coil is energized.

In the connection/disconnection apparatus, when the movement member moves to one side in the axial direction, the meshing member meshes with the first member to achieve the coupled state. When the movement member moves to the other side in the axial direction, the meshing member is unmeshed from the first member.

According to the electromagnetic actuator and the connection/disconnection apparatus of the aspects described above, the generation of abnormal noise can be suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention is described with reference to FIG. 1 to FIG. 5.

Figure 1:
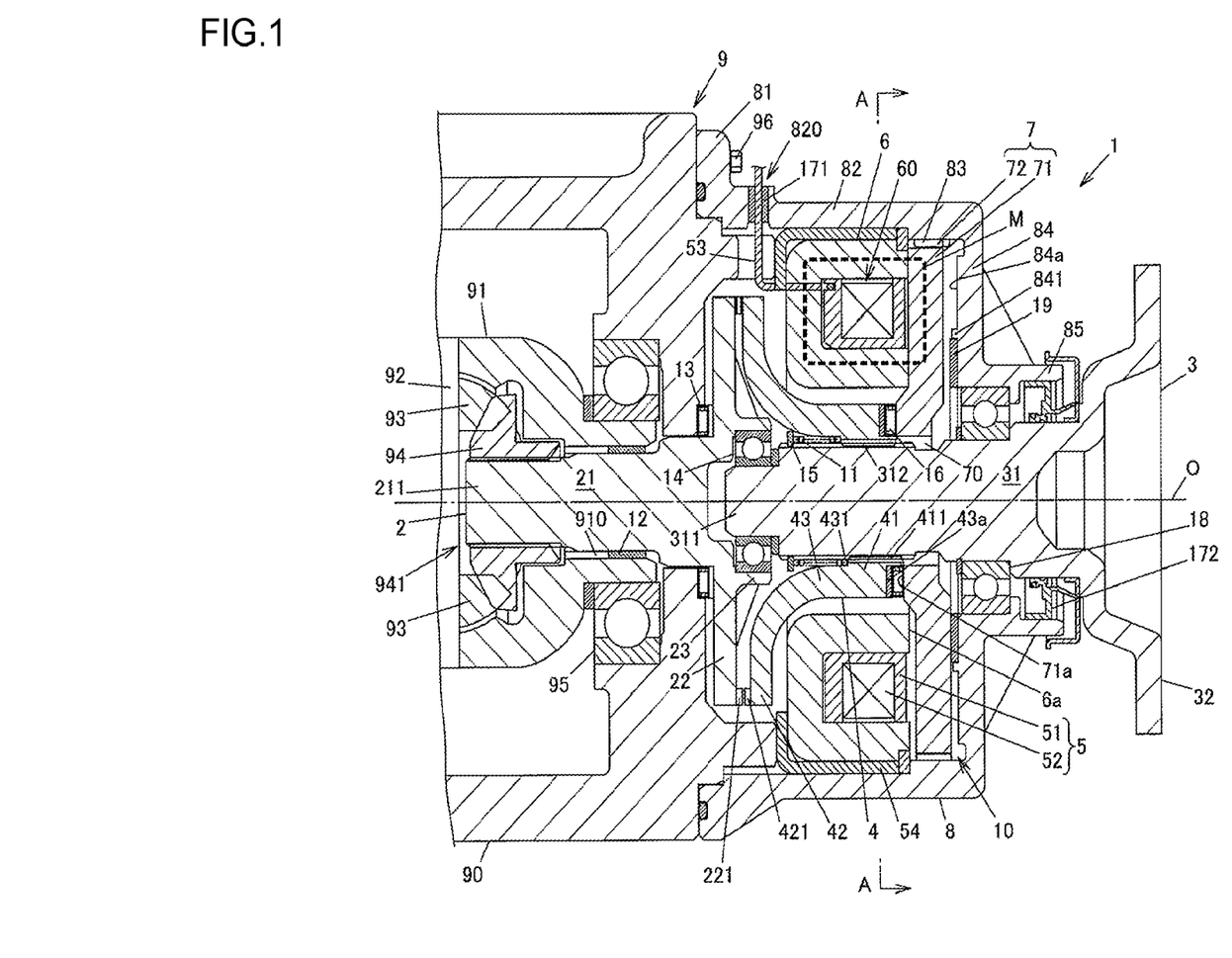
FIG. 1 is a sectional view illustrating an electromagnetic actuator and a connection/disconnection apparatus according to a first embodiment of the present invention.

FIG. 1 is a sectional view illustrating an electromagnetic actuator and a connection/disconnection apparatus according to a first embodiment of the present invention. FIG. 1 illustrates an example of a structure in which the connection/disconnection apparatus is mounted on a differential apparatus of a four-wheel drive vehicle including main driving wheels and auxiliary driving wheels and is used for interrupting transmission of a driving force to drive shafts of the auxiliary driving wheels.

A differential apparatus 9 includes a casing 90, a differential case 91, a pinion shaft 92, a pair of pinion gears 93, a pair of side gears 94, and a ball bearing 95. The casing 90 is fixed to a vehicle body. The differential case 91 is housed in the casing 90. The pinion shaft 92 is fixed to the differential case 91. The pinion gears 93 are rotatably supported by the pinion shaft 92. The side gears 94 mesh with the pinion gears 93 with their gear axes set orthogonal to each other. The ball bearing 95 supports the differential case 91 so that the differential case 91 is rotatable relative to the casing 90. FIG. 1 illustrates one side gear 94 out of the pair of side gears 94.

A connection/disconnection apparatus 1 includes an input shaft 2 and an output shaft 3. The input shaft 2 is coupled to the one side gear 94 so as not to be rotatable relative to the one side gear 94. The output shaft 3 is arranged so as to be coaxially rotatable relative to the input shaft 2. The input shaft 2 and the output shaft 3 share a rotation axis O. A direction parallel to the rotation axis O is hereinafter referred to as an axial direction.

The connection/disconnection apparatus 1 includes a dog member 4, an electromagnetic actuator 10, and a coil spring 11. The dog member 4 is coupled to the output shaft 3 so as to be axially movable but not to be rotatable relative to the output shaft 3. The electromagnetic actuator 10 moves the dog member 4 to one side in the axial direction. The coil spring 11 urges the dog member 4 to the other side in the axial direction. The input shaft 2 is one form of a first member of the present invention. The output shaft 3 is one form of a second member of the present invention. The dog member 4 is one form of a meshing member of the present invention. The coil spring 11 is one form of an urging member of the present invention.

The connection/disconnection apparatus 1 is configured to switch between a coupled state and a released state. In the coupled state, the input shaft 2 and the output shaft 3 are coupled by the dog member 4 so as not to be rotatable relative to each other. In the released state, the input shaft 2 and the output shaft 3 are rotatable relative to each other. When the input shaft 2 and the output shaft 3 are coupled to each other, the driving force is transmitted from the one side gear 94 to the drive shaft of the auxiliary driving wheel via the input shaft 2 and the output shaft 3. When the input shaft 2 and the output shaft 3 are decoupled from each other, the transmission of the driving force to the drive shaft of the auxiliary driving wheel is interrupted.

The input shaft 2 integrally has a shaft portion 21, a disc portion 22, and a short cylindrical portion 23. The shaft portion 21 has a fitting portion 211 at its one end. The fitting portion 211 is fitted to the one side gear 94. The disc portion 22 projects radially outward from the other end of the shaft portion 21. The cylindrical portion 23 protrudes toward the output shaft 3 from the disc portion 22. The fitting portion 211 of the shaft portion 21 is spline-fitted to a fitting hole 941 of the side gear 94. A plurality of dog teeth (meshing teeth) 221 are provided on the outer peripheral edge of the disc portion 22. The shaft portion 21 is inserted through an insertion hole 910 of the differential case 91. A plain bearing 12 is arranged between the outer peripheral surface of the shaft portion 21 and the inner peripheral surface of the insertion hole 910. A needle roller bearing 13 is arranged between the casing 90 and the end face of the disc portion 22 on the shaft portion 21 side.

The output shaft 3 integrally has a shaft portion 31 and a flange portion 32. The shaft portion 31 is arranged side by side with the shaft portion 21 of the input shaft 2 in the axial direction. The drive shaft is fastened to the flange portion 32. A boss portion 311 is provided at the distal end of the shaft portion 31 that is opposite to the flange portion 32. A ball bearing 14 is arranged between the boss portion 311 and the cylindrical portion 23 of the input shaft 2. A plurality of spline protrusions 312 extending in the axial direction are provided on the outer peripheral surface of the shaft portion 31. A snap ring 15 is fitted to the outer peripheral surface of the shaft portion 31.

The dog member 4 integrally has an annular fitting portion 41, a meshing portion 42, and a body 43. A plurality of spline protrusions 411 are provided on the inner peripheral surface of the fitting portion 41. The spline protrusions 411 mesh with the spline protrusions 312 of the output shaft 3. The meshing portion 42 is provided with a plurality of dog teeth 421 that mesh with the dog teeth 221 of the input shaft 2. The body 43 is provided between the fitting portion 41 and the meshing portion 42. The spline protrusions 411 mesh with the spline protrusions 312 of the output shaft 3 such that the dog member 4 is axially movable but not rotatable relative to the output shaft 3. The dog member 4 is provided with a stepped portion 431 on the inner periphery of the body 43. The coil spring 11 is arranged between the stepped portion 431 and the snap ring 15 while being compressed in the axial direction.

The electromagnetic actuator 10 includes an electromagnetic coil 5, a yoke 6, an armature 7, and a housing 8. The yoke 6 serves as a magnetic path of a magnetic flux of the electromagnetic coil 5. The armature 7 is a soft magnetic body configured to move in the axial direction while being attracted by the yoke 6 by energization of the electromagnetic coil 5. The housing 8 houses the armature 7. The armature 7 is one form of a movement member of the present invention. The housing 8 is one form of a housing member of the present invention.

The electromagnetic coil 5 is obtained by forming a winding 52 around a bobbin 51. The bobbin 51 is held by the yoke 6. A current is supplied to the winding 52 from a controller (not illustrated) via a lead wire 53. The yoke 6 has an annular recess 60 that is open in the axial direction. The electromagnetic coil 5 is housed in the recess 60. The yoke 6 is a ring-shaped soft magnetic body, and is supported inside the housing 8 by a tubular support member 54 formed of a laminated damping steel sheet. The fitting portion 41 of the dog member 4 is arranged on an inner side of the yoke 6, and the meshing portion 42 of the dog member 4 is arranged side by side with the yoke 6 in the axial direction.

In FIG. 1, an actuated state of the electromagnetic actuator 10 is illustrated above the rotation axis O, and an unactuated state of the electromagnetic actuator 10 is illustrated below the rotation axis O. In the actuated state of the electromagnetic actuator 10, a current is supplied to the winding 52 of the electromagnetic coil 5. In the unactuated state of the electromagnetic actuator 10, the armature 7 is spaced away from the yoke 6 in the axial direction by an urging force of the coil spring 11.

Figure 2:
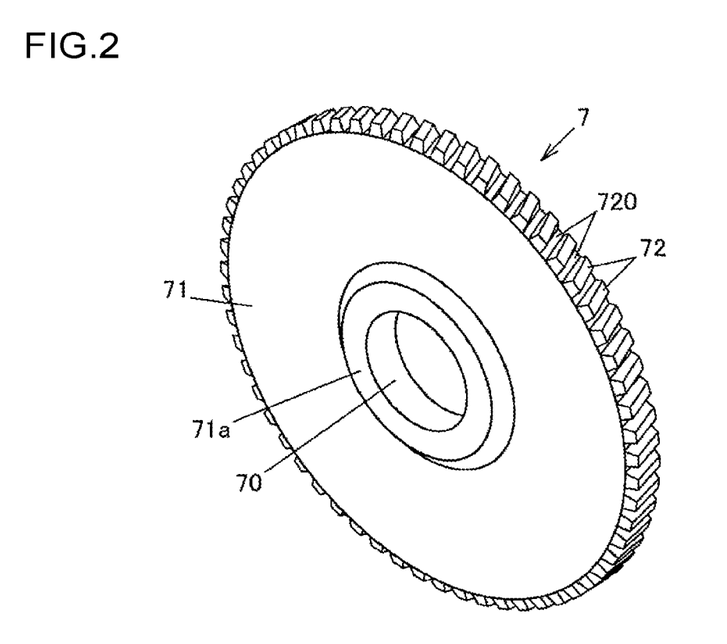
FIG. 2 is a perspective view illustrating an armature.

FIG. 2 is a perspective view illustrating the armature 7. The armature 7 integrally has a disc-shaped body 71 and spline teeth 72. A through hole 70 is formed at the center of the body 71. The output shaft 3 is inserted through the through hole 70. The spline teeth 72 serve as a plurality of protrusions provided on a radially outer side of the body 71. The spline teeth 72 are helical splines formed over the entire outer peripheral surface of the armature 7. The tooth traces of the helical splines are inclined with respect to the axial direction. For example, the inclination angle of the tooth traces of the spline teeth 72 is 1° or more, and is desirably 5° or more and 10° or less.

A needle roller bearing 16 is arranged between an axial end face 71a of the inner peripheral edge of the body 71 and an axial end face 43a of the body 43 of the dog member 4 at the end on the fitting portion 41 side. The dog member 4 is smoothly rotatable relative to the armature 7 by the needle roller bearing 16, and moves in the axial direction together with the armature 7.

The housing 8 integrally has a flange portion 81, a cylindrical portion 82, spline teeth 83, a wall portion 84, and a short cylindrical portion 85. The flange portion 81 is fixed to the casing 90 with bolts 96. The yoke 6 and the armature 7 are arranged inside the cylindrical portion 82. The spline teeth 83 serve as a plurality of protrusions provided on the inner periphery of the cylindrical portion 82. The wall portion 84 extends radially inward from one axial end of the cylindrical portion 82. The cylindrical portion 85 protrudes in the axial direction from the inner peripheral edge of the wall portion 84. The flange portion 81 is fixed to the casing 90 with the plurality of bolts 96. FIG. 1 illustrates one of the bolts 96.

The cylindrical portion 82 has a lead-out hole 820 through which the lead wire 53 is led out. A grommet 171 is fitted to the lead-out hole 820. The grommet 171 holds the lead wire 53. The support member 54 is press-fitted into the cylindrical portion 82. A seal member 172 and a ball bearing 18 are arranged between the cylindrical portion 85 and the shaft portion 31 of the output shaft 3.

Figure 3:
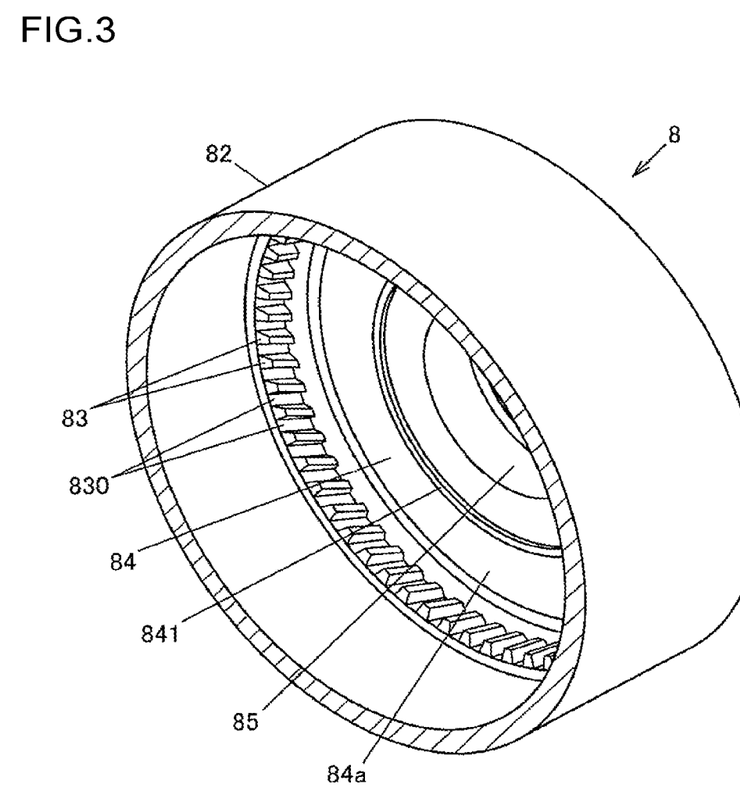
FIG. 3 is a local section perspective view of a housing that is partially cut out in a cross section along a line A-A of FIG. 1.

FIG. 3 is a local section perspective view of the housing 8 that is partially cut out in a cross section along a line A-A illustrated in FIG. 1. The spline teeth 83 are helical splines formed over the entire inner peripheral surface of the cylindrical portion 82 of the housing 8. The tooth traces of the helical splines are inclined at the same inclination angle as that of the spline teeth 72 of the armature 7. The armature 7 and the housing 8 are coupled to each other by an engagement structure in which the spline teeth 72 of the armature 7 engage with tooth spaces 830 each formed between the spline teeth 83 of the housing 8 and the spline teeth 83 of the housing 8 engage with tooth spaces 720 each formed between the spline teeth 72 of the armature 7.

The wall portion 84 of the housing 8 is provided with an annular protruding portion 841. The protruding portion 841 protrudes in the axial direction from a surface 84a of the wall portion 84 that faces the armature 7. A shim 19 having a shape of a ring plate is fixed by fitting on an inner side of the protruding portion 841. When the electromagnetic coil 5 is not energized, the armature 7 abuts against the shim 19 by the urging force of the coil spring 11. The shim 19 abuts against the axial end face of the armature 7 that is opposite to the yoke 6, thereby regulating the amount of movement of the armature 7 away from the yoke 6 by the urging force of the coil spring 11.

In the connection/disconnection apparatus 1 structured as described above, when the electromagnetic coil 5 is energized, a magnetic flux is generated in a magnetic path M indicated by a dashed line in FIG. 1. The armature 7 moves in the axial direction while being attracted toward the yoke 6 by a magnetic force of the electromagnetic coil 5. The armature 7 abuts (strikes) against an axial end face 6a of the yoke 6. The axial end face 6a of the yoke 6 is the open end face of the recess 60. Along with the axial movement of the armature 7, the dog member 4 is pressed by the armature 7 via the needle roller bearing 16 to move toward the input shaft 2, and the dog teeth 421 of the dog member 4 mesh with the dog teeth 221 of the input shaft 2. This operation achieves the coupled state in which the input shaft 2 and the output shaft 3 are coupled via the dog member 4 so as not to be rotatable relative to each other.

When the energization of the electromagnetic coil 5 is stopped in this state, the dog member 4 and the armature 7 are moved by the urging force of the coil spring 11 in a direction opposite to the direction when the electromagnetic coil 5 is energized. The dog teeth 421 of the dog member 4 are unmeshed from the dog teeth 221 of the input shaft 2, and thus the input shaft 2 and the output shaft 3 are rotatable relative to each other. The coil spring 11 urges the dog member 4 and the armature 7 in the direction opposite to the movement direction when the electromagnetic coil 5 is energized.

When the electromagnetic coil 5 is not energized, the armature 7 abuts against the shim 19 by the urging force of the coil spring 11. That is, the armature 7 moves in the axial direction between an initial position where the armature 7 abuts against the shim 19 and a movement end position where the armature 7 abuts against the yoke 6. For example, the movement distance (stroke) between the initial position and the movement end position is 2 mm, and is adjusted by the thickness of the shim 19.

The armature 7 moves in the axial direction relative to the housing 8 while keeping the engaging state in the engagement structure described above. At this time, the tooth spaces 830 each formed between the spline teeth 83 of the housing 8 function as engagement grooves where the spline teeth 72 of the armature 7 engage. The tooth spaces 720 each formed between the spline teeth 72 of the armature 7 function as engagement grooves where the spline teeth 83 of the housing 8 engage. The tooth spaces 720 and 830 are inclined with respect to the axial direction. Therefore, when the armature 7 moves while being attracted by the yoke 6, the armature 7 turns relative to the housing 8 along the inclination of the tooth spaces 720 and 830. The spline teeth 72 of the armature 7 slide along the tooth spaces 830 on the housing 8 side, and the spline teeth 83 of the housing 8 slide along the tooth spaces 720 on the armature 7 side.

Figure 4:
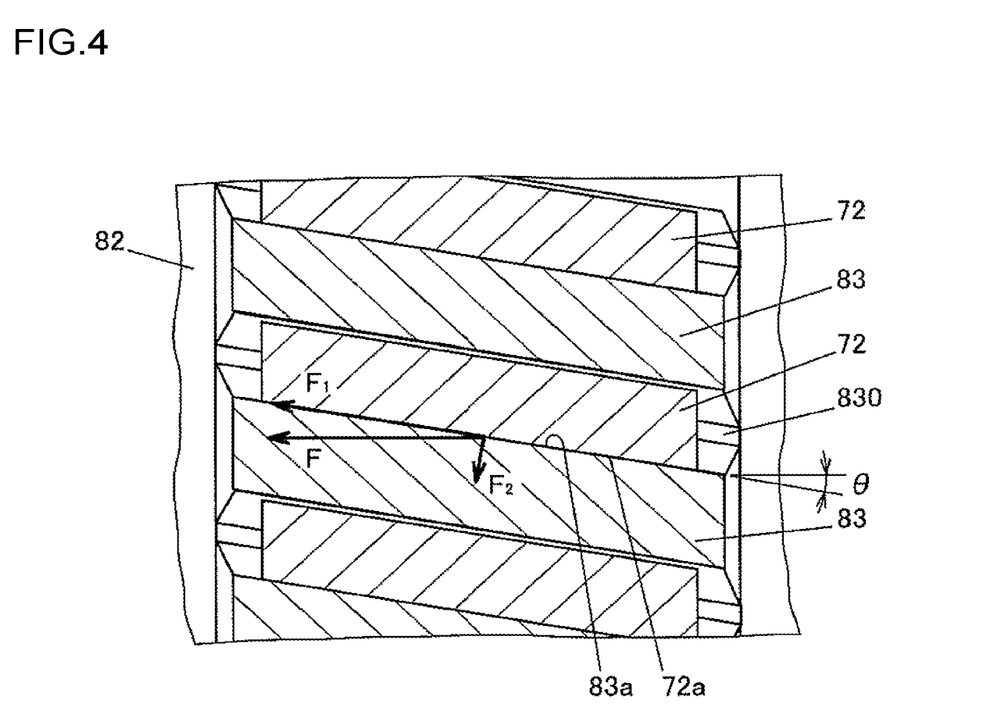
FIG. 4 is an explanatory drawing illustrating a circumferential section indicating meshing portions between spline teeth of the armature and spline teeth of the housing.

FIG. 4 is an explanatory drawing illustrating a circumferential section indicating meshing portions between the spline teeth 72 of the armature 7 and the spline teeth 83 of the housing 8. FIG. 4 illustrates a cross section including contact portions between tooth flanks 72*a* of the spline teeth 72 of the armature 7 and tooth flanks 83*a* of the spline teeth 83 of the housing 8. In FIG. 4, F represents the magnetic force of the electromagnetic coil 5 to be received by the armature 7 when the armature 7 moves, $F_1$ represents a component force of the magnetic force in a tooth trace direction, and $F_2$ represents a component force of the magnetic force in a direction perpendicular to the tooth trace.

When the electromagnetic coil 5 is energized, the armature 7 moves in the tooth trace direction due to the component force $F_1$ in the tooth trace direction, and the spline teeth 72 of the armature 7 receive a frictional resistance force from the spline teeth 83 of the housing 8 due to the component force $F_2$ in the direction perpendicular to the tooth trace. With the frictional resistance force, the movement speed of the armature 7 decreases. As an example, FIG. 4 illustrates a case where an inclination angle θ of the tooth traces of the spline teeth 72 and 83 is 10°.

Figure 5:
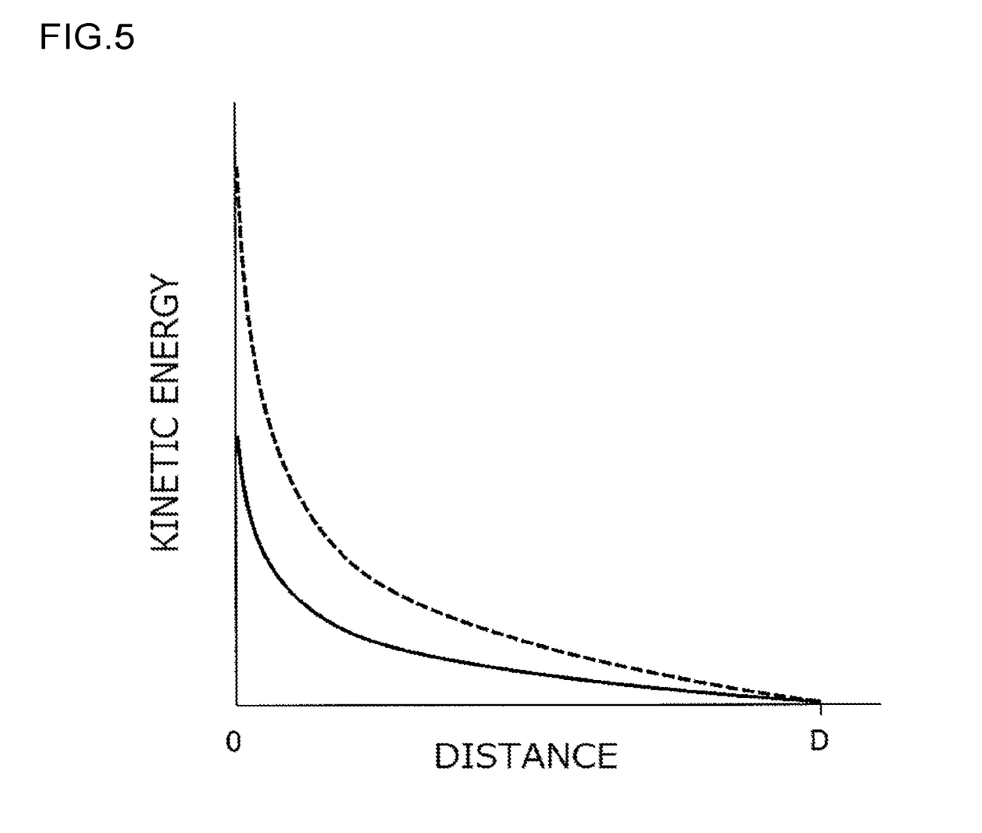
FIG. 5 is a graph illustrating a relationship between kinetic energy of the armature and a distance between the armature and a yoke.

FIG. 5 is a graph illustrating a relationship between kinetic energy of the armature 7 and a distance between the armature 7 and the yoke 6 when the armature 7 moves from the initial position to the movement end position. In FIG. 5, a continuous line indicates a change in the kinetic energy in the case of the present embodiment, and a dashed line indicates a change in the kinetic energy in a case of a comparative example where the spline teeth 72 and 83 are not formed on the armature 7 and the housing 8, respectively. On the horizontal axis of this graph, D represents a distance between the armature 7 and the yoke 6 when the armature 7 is located at the initial position.

As illustrated in FIG. 5, in the present embodiment, the movement speed of the armature 7 decreases because the spline teeth 72 of the armature 7 receive the frictional resistance force from the spline teeth 83 of the housing 8. Therefore, when the armature 7 abuts against the yoke 6 (when the distance between the armature 7 and the yoke 6 is zero), the kinetic energy is smaller than that in the comparative example. Thus, striking noise caused when the armature 7 abuts against the yoke 6 is reduced, thereby reducing the occurrence of a case where a driver or a passenger of the vehicle perceives the striking noise as abnormal noise, causing discomfort thereto.

In the present embodiment, the spline teeth 72 that are the helical splines formed over the entire outer peripheral surface of the armature 7 mesh with the spline teeth 83 that are the helical splines formed over the entire inner peripheral surface of the cylindrical portion 82 of the housing 8. Therefore, the contact area increases between the armature 7 and the housing 8, and the movement speed of the armature 7 decreases by a great frictional resistance force. Thus, the striking noise can be reduced sufficiently.

Figure 6:
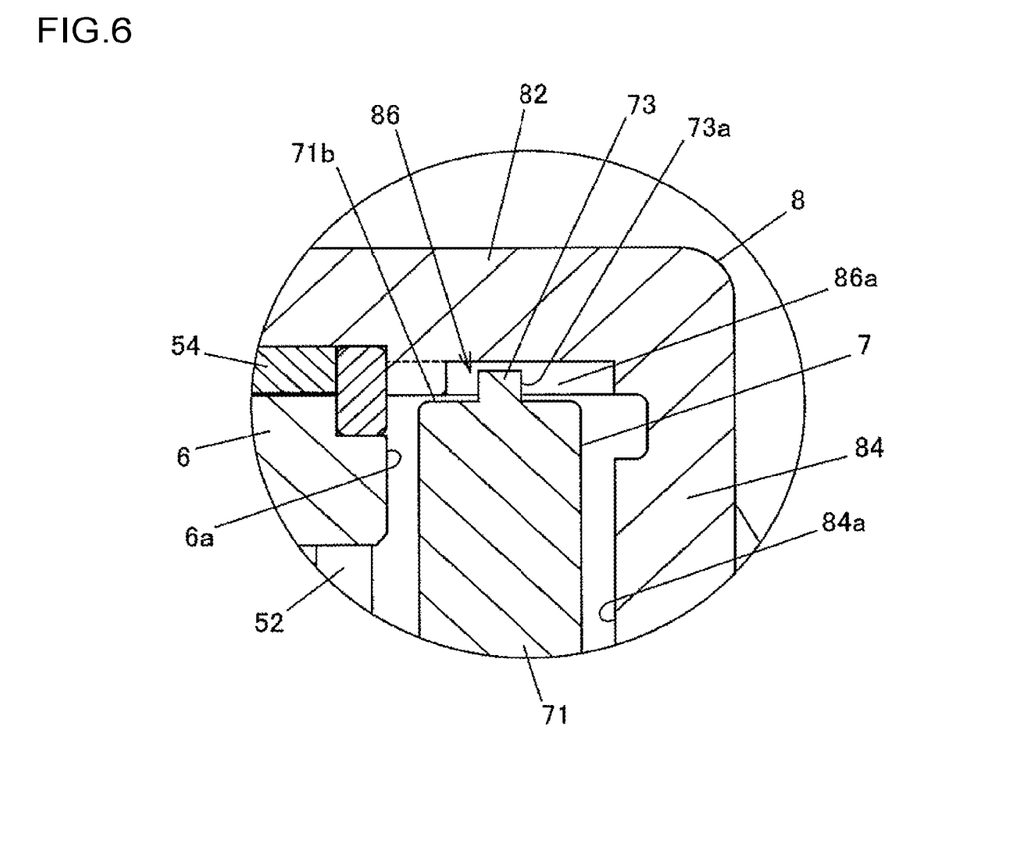
FIG. 6 is a sectional view illustrating a part of a connection/disconnection apparatus according to a second embodiment.
Figure 7:
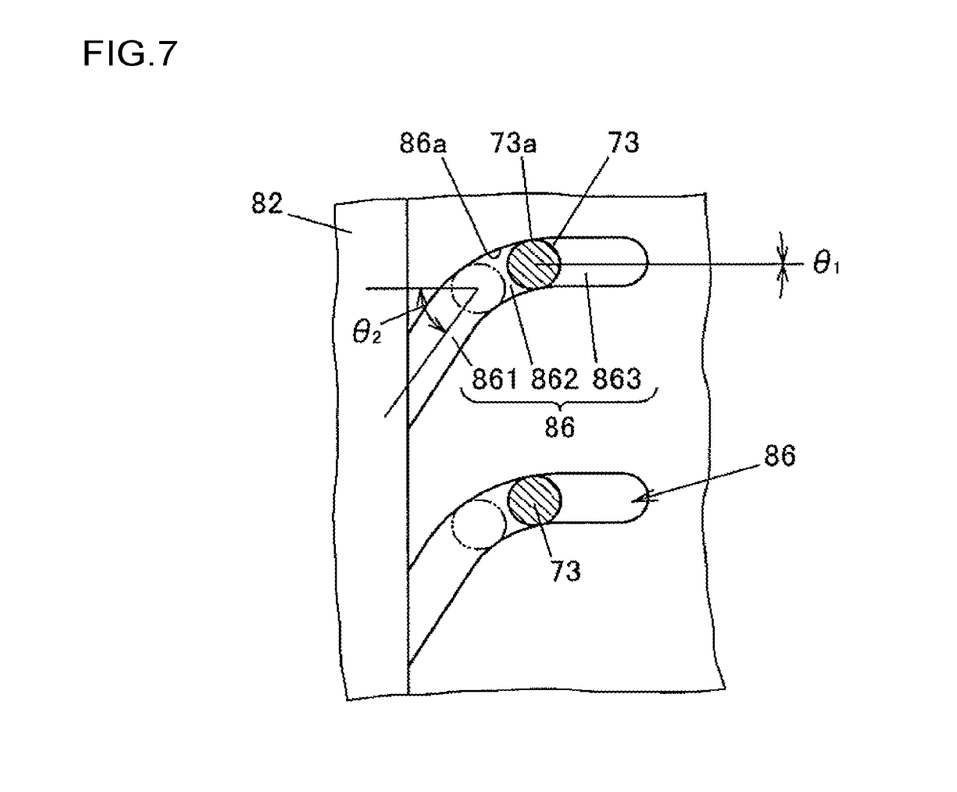
FIG. 7 is a schematic view illustrating an engagement structure according to the second embodiment.

Next, a second embodiment of the present invention is described with reference to FIG. 6 and FIG. 7. FIG. 6 is a sectional view illustrating a part of a connection/disconnection apparatus 1 according to the second embodiment. FIG. 7 is a schematic view illustrating an engagement structure according to the second embodiment. The second embodiment differs from the first embodiment in terms of the engagement structure between the armature 7 and the housing 8. Therefore, this difference is mainly described. In the following description, parts in common with those of the first embodiment are represented by the same names and reference symbols as those of the members or parts that are used in the first embodiment.

In the present embodiment, the armature 7 is provided with a plurality of boss-shaped (columnar) protrusions 73 in place of the helical splines. A plurality of partially curved engagement grooves 86 are formed on the inner peripheral surface of the cylindrical portion 82 of the housing 8 in place of the helical splines. The protrusions 73 of the armature 7 are provided upright on an outer peripheral surface 71*b* of the body 71 to protrude in a radial direction and engage with the engagement grooves 86. When the electromagnetic coil 5 is energized, the protrusions 73 slide along the engagement grooves 86, and a frictional resistance force is generated between outer peripheral surfaces 73*a* of the protrusions 73 and faces 86*a* of the engagement grooves 86.

In FIG. 7, the inner peripheral surface of the cylindrical portion 82 of the housing 8 where the engagement grooves 86 are formed is illustrated together with the protrusions 73 of the armature 7. The vertical direction of FIG. 7 corresponds to a circumferential direction of the cylindrical portion 82, and the lateral direction of FIG. 7 corresponds to the axial direction. In FIG. 7, continuous lines indicate the protrusions 73 when the armature 7 is located at the initial position, and imaginary lines (long dashed double-short dashed lines) indicate the protrusions 73 when the armature 7 is located at the movement end position.

The engagement groove 86 is formed by cutting work using a cutting tool such as an end mill. The engagement groove 86 has an inclined portion 861, a curved portion 862, and a straight portion 863. The inclined portion 861 is inclined with respect to the axial direction. The curved portion 862 is curved into an arc shape. The straight portion 863 is parallel to the axial direction. The inclined portion 861 is formed closer to the yoke 6 than the curved portion 862. The straight portion 863 is formed closer to the wall portion 84 of the housing 8 than the curved portion 862. The inclined portion 861 is inclined at an inclination angle of the end of the curved portion 862 on the inclined portion 861 side with respect to the axial direction, and the inclined portion 861 and the curved portion 862 are smoothly connected to each other without a step. The end of the curved portion 862 that is opposite to the inclined portion 861 is smoothly connected to the straight portion 863 without a step.

When the armature 7 is located at the initial position, the protrusion 73 is located at the end of the curved portion 862 on the straight portion 863 side. When the armature 7 is located at the movement end position, the protrusion 73 is located at the end of the curved portion 862 on the inclined portion 861 side. That is, when $\theta_1$ represents an inclination angle of the engagement groove 86 with respect to the axial direction at a part that engages with the protrusion 73 when the armature 7 is located at the initial position, and $\theta_2$ represents an inclination angle of the engagement groove 86 with respect to the axial direction at a part that engages with the protrusion 73 when the armature 7 is located at the movement end position, $\theta_2$ is larger than $\theta_1$. The curved portion 862 is curved so that the inclination of a part that engages with the protrusion 73 with respect to the axial direction gradually increases from $\theta_1$ to $\theta_2$ as the armature 7 approaches the yoke 6.

In the present embodiment, $\theta_1$ is 0°, but may be a predetermined angle larger than 0° and smaller than $\theta_2$. When the armature 7 is located at the initial position, the protrusion 73 may be located at the straight portion 863. When the armature 7 is located at the movement end position, the protrusion 73 may be located at the inclined portion 861.

Also in the present embodiment, the striking noise caused when the armature 7 abuts against the yoke 6 is reduced, thereby reducing the occurrence of the case where the driver or the passenger of the vehicle perceives the striking noise as abnormal noise, causing discomfort thereto. Owing to the relationship of $\theta_1<\theta_2$, the armature 7 can easily move from the initial position when the electromagnetic coil 5 is energized, and the frictional resistance force received by the protrusions 73 increases as the armature 7 approaches the movement end position. Therefore, the kinetic energy caused when the armature 7 abuts against the yoke 6 is further reduced, thereby further reducing the striking noise.

The present invention may be modified as appropriate without departing from the spirit of the present invention. For example, the embodiments described above are directed to the case where the electromagnetic actuator 10 is applied to the connection/disconnection apparatus 1 configured to connect or disconnect the first member (input shaft 2) and the second member (output shaft 3). The application of the electromagnetic actuator 10 is not limited to the connection/disconnection apparatus 1. The electromagnetic actuator 10 may be used for various purposes.

The embodiments described above are directed to the case where the connection/disconnection apparatus 1 is mounted on the differential apparatus of the four-wheel drive vehicle. The present invention is not limited to this case. The connection/disconnection apparatus 1 may be used at other parts of the vehicle, or may be used for various apparatuses other than the vehicle such as a machine tool.

The embodiments described above are directed to the case where both the first member and the second member to be connected or disconnected by the connection/disconnection apparatus 1 are rotating bodies. The present invention is not limited to this case. One of the first member and the second member may be a non-rotatable member. In this case, the connection/disconnection apparatus 1 functions as a braking apparatus configured to stop rotation of the rotating body that is one of the first member and the second member relative to the non-rotatable member that is the other one of the first member and the second member.

The second embodiment described above is directed to the case where the protrusions 73 are provided on the armature 7 and the engagement grooves 86 are formed in the housing 8. Conversely, protrusions corresponding to the protrusions 73 may be provided on the housing 8 and engagement grooves that engage with the protrusions may be formed in the armature 7. Also in this case, actions and effects similar to those of the second embodiment described above can be attained by providing the curved portion formed so that the inclination of the engagement groove with respect to the axial direction at the part that engages with the protrusion increases as the armature 7 approaches the yoke 6.

What is claimed is:

1. An electromagnetic actuator, comprising:
an electromagnetic coil;
a yoke serving as a magnetic path of a magnetic flux of the electromagnetic coil;
an armature configured to move in an axial direction while being attracted by the yoke by energization of the electromagnetic coil; and
a housing member that houses the armature, wherein
the armature and the housing member are coupled to each other by an engagement structure in which a protrusion provided on one of the armature and the housing member engages with an engagement groove formed in the other one of the armature and the housing member,
at least a part of the engagement groove is inclined with respect to the axial direction, and
when the armature moves while being attracted by the yoke, the protrusion slides along the engagement groove, and the armature turns relative to the housing member along inclination of the engagement groove.

2. The electromagnetic actuator according to claim 1, wherein
helical splines are formed on an outer peripheral surface of the armature and on an inner peripheral surface of the housing member, and
the engagement structure is a structure in which spline teeth of the helical splines that are provided on one of the armature and the housing member as the protrusion engage with tooth spaces of the helical splines that are formed in the other one of the armature and the housing member as the engagement groove.

3. The electromagnetic actuator according to claim 1, wherein the engagement groove has a curved portion formed so that inclination of a part that engages with the protrusion with respect to the axial direction increases as the armature approaches the yoke.

4. A connection/disconnection apparatus configured to switch between a coupled state in which a first member and a second member are coupled so as not to be rotatable relative to each other and a released state in which the first member and the second member are rotatable relative to each other, the connection/disconnection apparatus comprising:
the electromagnetic actuator according to claim 1;
a meshing member that is coupled to the second member so as to be axially movable but not to be rotatable relative to the second member and is configured to move in the axial direction together with the armature; and
an urging member configured to urge the meshing member and the armature in a direction opposite to a movement direction when the electromagnetic coil is energized, wherein
when the armature moves to one side in the axial direction, the meshing member meshes with the first member to achieve the coupled state, and
when the armature moves to the other side in the axial direction, the meshing member is unmeshed from the first member.

* * * * *